United States Patent [19]

Muther

[11] 4,153,552
[45] May 8, 1979

[54] METHOD FOR REGENERATING FILTERS

[75] Inventor: Richard M. Muther, Lakewood, Colo.

[73] Assignee: Environmental Industrial Products, Denver, Colo.

[21] Appl. No.: 822,133

[22] Filed: Aug. 5, 1977

[51] Int. Cl.² .................................... B01D 23/24
[52] U.S. Cl. ................................ 210/82; 210/108; 210/425; 210/427
[58] Field of Search .................. 210/75, 79, 81, 82, 210/86, 95, 99, 108, 111, 138, 193, 269, 275, 277, 278, 332, 333 R, 333 A, 334, 393, 411, 412, 422, 425, 427, 456, 66, 67, 323 T, 354, 355

[56] References Cited
U.S. PATENT DOCUMENTS

| | | | |
|---|---|---|---|
| 3,100,190 | 8/1963 | Hobson | 210/106 |
| 3,679,052 | 7/1972 | Asper | 210/82 |
| 3,744,633 | 7/1973 | Schmidt et al. | 210/82 |
| 3,862,036 | 1/1975 | Simmons | 210/412 |

Primary Examiner—Frank Sever
Attorney, Agent, or Firm—Sheridan, Ross, Fields & McIntosh

[57] ABSTRACT

Method and apparatus for regenerating a diatomaceous earth filter cake of a pressurized liquid filter system by liquidizing the diatomaceous earth filter cake formed on filter elements in the filter chamber of the system; by uniformly mixing with the liquidized diatomaceous earth the insoluble particles, or impurities, removed by the filter cake from liquid that has passed through the cake; and by reforming the fluid cake with the impurities uniformly distributed throughout the filter cake. The liquidizing of the filter cake and impurities and mixing of the diatomaceous earth and impurities result from oscillations induced in the liquid in the filter chamber by several cycles of rapid reversal of the flow of liquid through the filter chamber.

11 Claims, 7 Drawing Figures

METHOD FOR REGENERATING FILTERS

BACKGROUND OF THE INVENTION

1. Field of the Invention

This invention is in the field of pressure filter systems in which a pressure differential in the liquid being filtered is maintained across a filter element and particularly to such systems in which the filter elements are hollow porous wall filter tubes whose filtering capability are significantly enhanced by forming on the surface of the porous walls of the filter tubes filter cake from finely divided filter material by causing the liquid portion of a slurry of the filter material and liquid to flow through the filter tubes. More particularly this invention is in the field of methods and apparatus for regenerating the filter cake of such filter systems so that the useful life of the filter material forming the filter cake is significantly extended.

2. Description of the Prior Art

Pressure filter systems for removing undesirable insoluble solids from a liquid such as water are well known in the art. Typically these systems have a pressure vessel whose interior is divided into a filter chamber into which the liquid to be filtered is introduced and a filtrate chamber into which the filtered liquid flows. The filtering elements are hollow filter tubes having porous walls which are mounted in the filter chamber with the interior of the filter tubes in communication with the filtrate chamber. The mounting means for the filter tubes divides or isolates the two chambers so that liquid can flow from the filter chamber to the filtrate chamber only after passing through a filter tube. The surfaces of the filter tubes have built up on them a layer of filter material, diatomaceous earth, to form a filter cake. The filter cake is produced by forming a slurry of diatomaceous earth with the liquid to be filtered, water for example, in a precoat tank and the slurry is then pumped into the filter chamber. As the liquid portion of the slurry flows through the porous walls of the filter tubes, the diatomaceous earth builds, or forms, the filter cake on the exterior cylindrical surfaces of the porous walls of the filter tubes. After the filter cake is formed the liquid to be filtered is pumped into the filter chamber and flows through the filter cake into the hollow portion of the filter tubes and through the tubes to the filtrate chamber. The filtrate then flows through an outlet pipe to where it is to be used or stored.

Undesirable elements in the fluid being filtered, impurities, are trapped or retained on the outer surfaces of the filter cake. As filtration continues the solids retained on the surface of the filter cake create a substantially impermeable crust. The flow rate of the liquid through the filter system is reduced and the pressure in the filter chamber increases. When the efficiency of the filter system decreases due to the resistance of the filter cake to the flow of fluid through it because of the impurities on the surface, the prior art teaches regenerating the filter cake by backflushing the filter system. In a backflushing operation, the liquid in the filter system is forced to flow in the opposite direction from normal through the porous walls of the filter tubes to remove the filter cake and remove the trapped impurities from the tubes which then flow through a sludge opening in the bottom of the filter chamber to a sludge receiver. Backflushing or backwashing can be accomplished by introducing compressed air into the filtrate chamber of the system. The filter tubes are then recoated with fresh clean diatomaceous earth to reform the filter cake prior to resuming normal operation of the filter system.

The problem with the prior art's manner of regenerating the filter cake once it has been clogged with solids removed from the filtrate is that it uses the filter powder or material only once. Further, the cleaning of the filter system and precoating of the filter tubes requires time during which the filter system is out of operation or production and thus reduces the overall capacity of the filter system.

There have been attempts in the past to reuse and regenerate the filter cake without dumping the filter media each time. These procedures, up until now, have proven to be only partially successful and produce additional problems not encountered before. When the pressure drop across the filter tubes increases to a point that indicates that the surface of the filter cake is substantially clogged with contaminants or sludge, a vibrator or hammering device has been applied to the tube support sheet in an effort to dislodge and break up the filter cake from the tubes. Theoretically, the filter cake is to be placed back into solution in the liquid, but the hammering only partially breaks the cake loose from the tubes and what cake is removed usually remains in relatively large chunks preventing an even regeneration of the cake on the tubes. In addition, another problem occurs in that the mechanical forces on the tube sheet and vessel can cause leakage around the tube flanges or even in the vessel flanges. An externally leaking filter is naturally undesirable. An internally leaking filter is intolerable in that the contaminants pass through to the outlet defeating the purpose or usefulness of the filter.

SUMMARY OF THE INVENTION

The present invention provides a method and apparatus for hydraulically regenerating the filter cake formed by depositing filter particles from a slurry of such particles on a porous filter surface on a filter element in the filter chamber of a liquid filter system. This is accomplished by causing the liquid in the pressure vessel of the system to oscillate through several cycles by rapidly reversing the direction of flow of the fluid in the filter chamber. The hydraulic oscillations of the liquid liquidize, or put into suspension, the filter material of the cake and the solid material removed from the filtrate and thoroughly mix them. The normal or forward direction of flow of liquid through the filter chamber is then resumed to reform on the porous filter surface a new filter cake which has distributed through it the solid material removed from the filtrate during prior operation of the filter system.

To produce rapid oscillations of the liquid to regenerate the filter cake the filter system is provided additionally with a surge pipe through which liquid within the filter chamber can flow into the precoat tank of the system. A surge valve controls such flow, or permits such flow, only during a regeneration cycle of the filter system.

It is therefore an object of this invention to provide a method and apparatus to regenerate in the filter chamber the filter cake of a liquid filter system.

Is is another object of this invention to provide a method and apparatus to permit the repetitive use of the same filter material in a pressurized liquid filter system.

It is still another object of this invention to regenerate the filter material of a liquid filter system which makes it possible to use the same filter material for many cycles of operation and thus produces a significant savings in materials and labor necessary to filter a given amount of liquid under comparable conditions. This significantly increases the efficiency or productive capacity of the filter system because the period of time the filter system is being serviced is significantly reduced.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
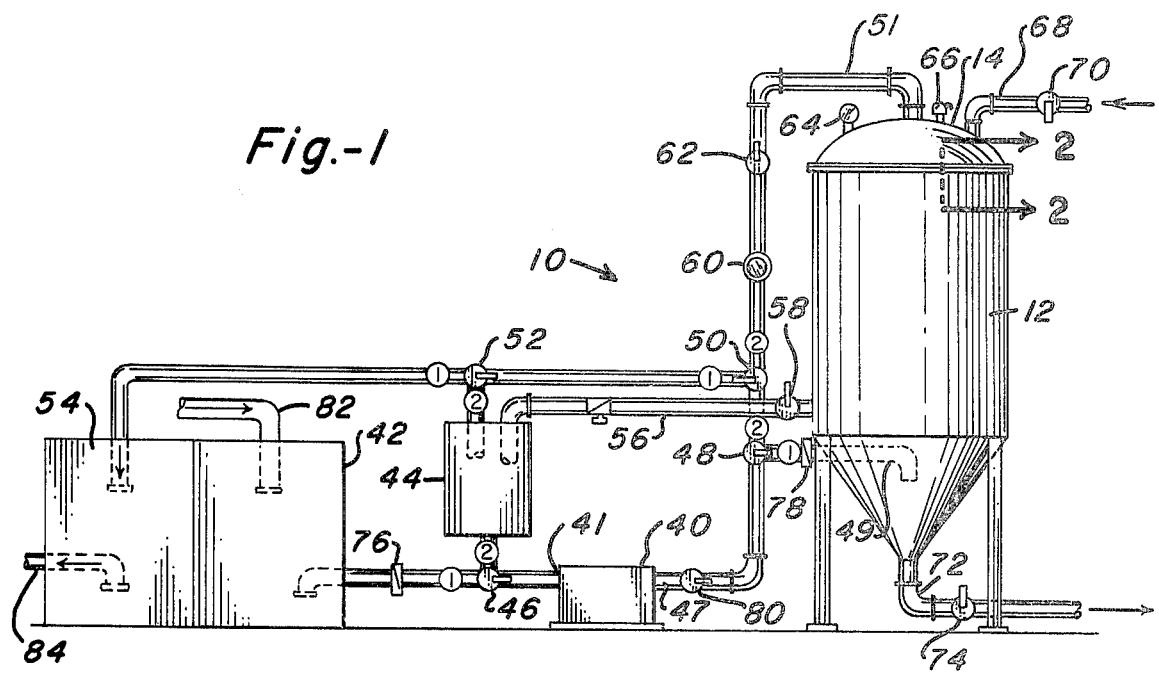
FIG. 1 is a side elevation of a filter system embodying the invention.
Figure 2:
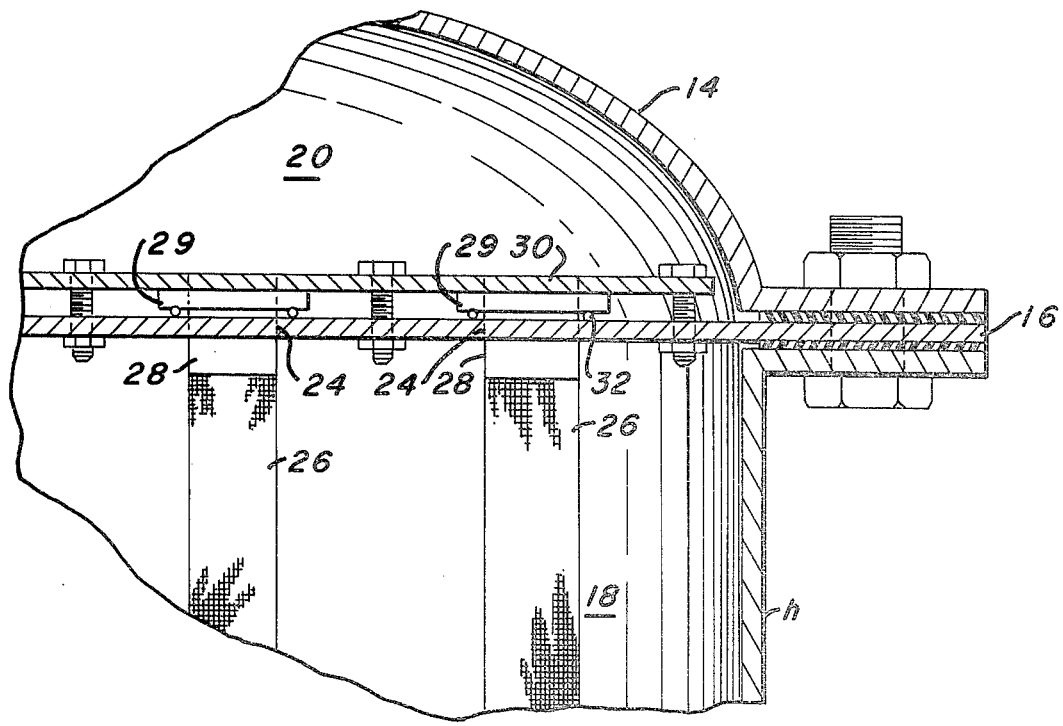
FIG. 2 is an enlarged fragmentary sectional view taken on the plane of line 2—2 of FIG. 1.

In FIG. 1, pressurized liquid filter system 10 has a pressurized filter vessel or housing 12 which has a pressure dome 14 bolted to it. As is best illustrated in FIG. 2, the interior of housing 12 and pressure dome 14 are divided by filter tube support disc or sheet 16 into a filter chamber 18 and a filtrate chamber 20. The interior of the low tapered portion of vessel 12 forms a sludge chamber 22.

A plurality of filter tube receiving openings 24 are formed in support sheet 16 through each of which is placed a filter tube 26. Each filter tube 26 has a cylindrical collar 28 which has a flange 29, preferably formed integrally with collar 28 as is best illustrated in FIG. 2. Filter tubes 26 are held in place by filter tube retainer disc 30 which is bolted to support disc 16 by a plurality of nuts and bolts with the flanges 29 of each of the tubes 26 positioned between support disc 16 and retainer disc 30. An "O" ring 32 is placed between each of the flanges 29 and the support disc 16 to prevent liquid in filter chamber 18 from flowing into filtrate chamber 20 except as a result of flowing through a filter tube 26.

Figure 4:
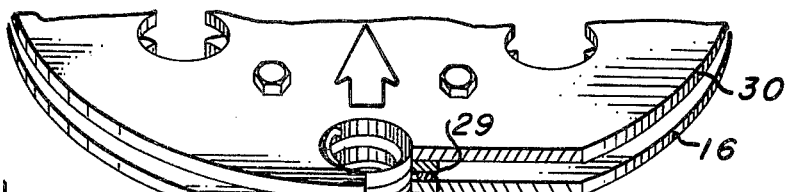
FIG. 4 is a fragmentary perspective view partially broken away to show details of a filter tube.

Each filter tube 26, as is best illustrated in FIG. 4, is hollow and has a metal helical spring 34 which is fixedly secured to collar 28 by welding, for example. A standard stainless steel screen mesh 36 is wrapped around the outer surfaces of coil spring 34 and is spot welded to it. The helical spring's chief function is to position screen 36 and to prevent its collapse due to the pressure across it as liquid flows through it. The lower portion of each filter tube 26 is closed off by a cap 38 which is fixedly secured to spring 34 and screen 36 to prevent liquid from flowing directly into the interior of tube 26 without flowing through screen 36.

Conventional centrifugal pump 40 has its intake port 41 connected to a source of liquid to be filtered such as the contents of inlet tank 42 or to the liquid in precoat tank 44 through conventional pipes or fluid conductors as determined by the state or condition of valve 46. Valve 46 when it is in its first state or condition connects intake port 41 of pump 40 to inlet tank 42. When valve 46 is in its second state or condition it connects intake port 41 of pump 40 to precoat tank 44.

Fluid from output port 47 of pump 40 can flow into filter chamber 18 through conventional piping depending upon the state or condition of valve 48. When valve 48 is in its first state, fluid from pump 40 flows into filter chamber 18 through filter inlet pipe 49. When valve 48 is in its second state, liquid from pump 40 is directed to valve 50. Valve 50 when in its second state, and if valve 48 is in its second state, causes the output from pump 40 to flow into the filtrate chamber 20 through filtrate pipe 51.

Valve 50 when in its first state or condition permits filtrate to flow from filtrate chamber 20 to valve 52. Valve 52 when in its first state causes filtrate to discharge into filtrate tank 54. When valve 52 is in its second state, filtrate will be discharged into precoat tank 44. Liquid can also flow from the filter chamber 18 into precoat tank 44 through surge pipe 56 when surge valve 58 is in its second state. When surge valve 58 is in its first condition, or state, surge line 56 is closed, or blocked, and no liquid can flow from filter chamber 18 into precoat tank 44.

Filtrate pipe 51 is provided with a sight glass 60 and a blow down shut off valve 62. A conventional pressure gauge 64 is mounted on dome 14 and a pressure safety valve 66 is also mounted on dome 14. To backwash filter system 10, compressed air can be applied to filtrate chamber 20 through compressed air line 68 which is provided with a valve 70 to turn on or off compressed air from a conventional source which is not illustrated. Sludge line 72 runs from the bottom of sludge chamber 22 to a conventional sludge receiver which is not illustrated. Line 72 is provided with a sludge valve 74 which when closed prevents any fluid from flowing through line 72 and when it is open permits sludge, impurities and filter materials, as well as liquid in filter chamber 18 and filtrate chamber 20 to be forced out of the system. The fluid conductor from inlet tank 42 to valve 46, in a preferred embodiment, is provided with a conventional check valve 76, and filter inlet pipe 49 is also provided with a check valve 78. The conductor from pump 40 to valve 48 is provided with a conventional pressure control valve 80 in a preferred embodiment.

Inlet, or inlet tank 42, is kept filled with the liquid to be filtered which liquid flows into tank 42 through pipe or liquid conductor 82. The source of the fluid to be filtered can be, for water, such natural sources as wells, lakes, reservoirs, or rivers; or the source could be the effluent from various industrial processes, swimming pools and the like. Filter systems of the type disclosed can also be used to filter fluids other than water such as dry cleaning fluids and the like.

The first step in putting filtering system 10 into operation is to fill the system with the liquid to be filtered. This is accomplished by setting valve 46 to its first state, which connects inlet port 41 of pump 40 with liquid in the inlet tank 42. Valve 48 is set to its first state which directs fluid from pump 40 into filter chamber 18. Surge valve 58 is put in its first state so that liquid from within filter chamber 18 cannot flow through surge line 56 into precoat tank 44. Valve 50 is put in its first state and valve 52 is placed in its second state so that when filtrate chamber 20 is filled with liquid, the liquid can flow into precoat chamber 44 which in a preferred embodiment is open at the top. Pump 40 is started and run until precoat tank 44 is substantially full of liquid at which time pump 40 is stopped.

The next step is to precoat the filter tubes with an appropriate filter material, or to form the filter cake on the exterior surfaces of the filter tubes 26. In a preferred embodiment, the filter material, or powder, is diatomaceous earth, or diatomite. Valve 46 is positioned to its second state in which pump 40 pumps water from precoat tank 44 rather than from inlet tank 42. The states of the remaining valves of the system are the same as for filling the system and thus are unchanged. Pump 40 is started and the proper amount of filter material is poured into precoat tank 44 necessary to form a coating, or cake, on the mesh or screen 36 of each filter tube 26. The thickness of the cake in a preferred embodiment is substantially one-eighth of an inch. After all the filter material is poured into precoat tank 44, and the amount is a function of the area of the filter tubes, the pump 40 is kept running until the liquid flowing past the sight glass 60 is clear, which indicates that the filter cake 82 has been formed on the filter tubes 26.

Figure 3:
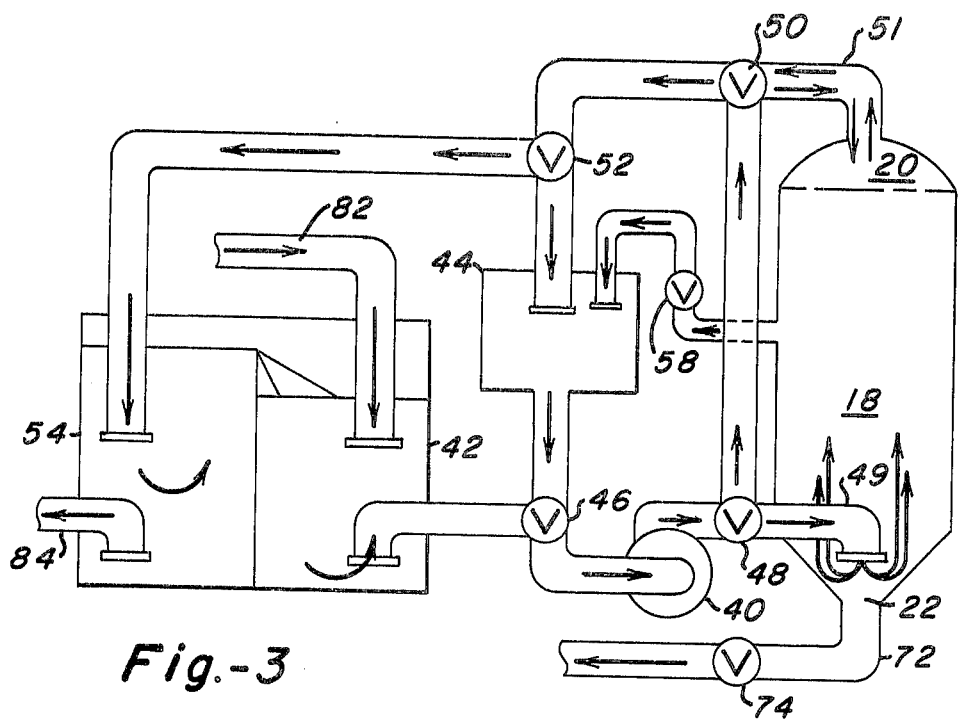
FIG. 3 is a schematic block diagram of a filter system embodying the invention.

To go on stream or to start a production run, it is only necessary to reposition valve 46 to its first state so that pump 40 draws liquid from inlet tank 42 and valve 52 to its first state which causes filtrate from filtrate chamber 20 to flow into filtrate tank 54. Filtrate tank 54 is removed through outlet pipe 84. Part of the filtrate can be mixed or added to the liquid in inlet tank 42 to improve the degree of filtration, if desired, by permitting some of the filtrate to flow into tank 42 as is illustrated in FIG. 3.

Figure 7:
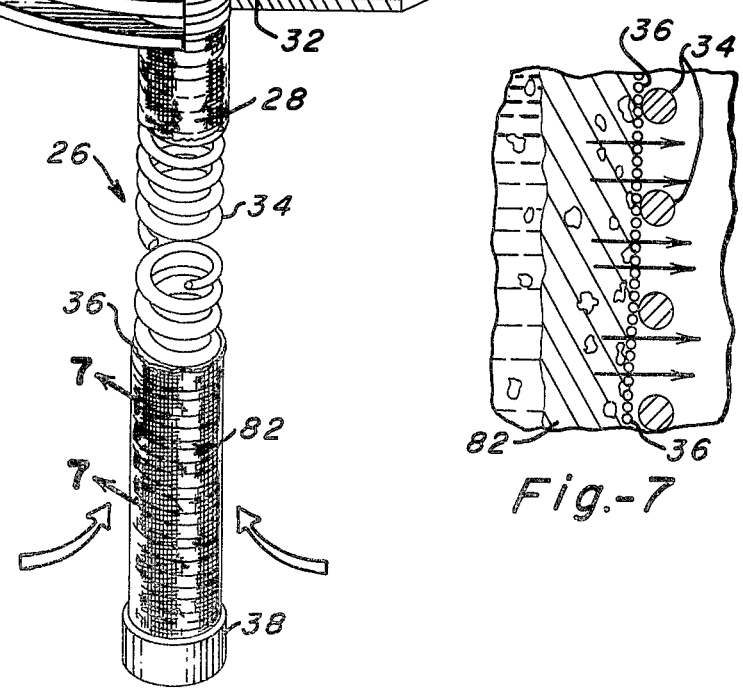
FIG. 7 is an enlarged fragmentary sectional view taken on the plane of line 7—7 of FIG. 4.

During the production cycle liquid to be filtered flows through the filter cake 82 as is illustrated in FIG. 7, which is built up on the upstream side of mesh 36 from the individual diatoms in the slurry, pumped through the system during the precoating cycle. As liquid to be filtered flows through filter cake 82, the solid particles suspended in the liquid are removed or retained on the outer surfaces of cake 82. As the production cycle continues, or filtration continues, the solids retained on the surface of filter cake 82 create a substantially impermeable crust or layer. This causes the resistance of the filter cake to the flow of fluid through it to increase, reducing the flow and increasing the pressure of the liquid in filter chamber 18. When the pressure in filter chamber 18 reaches a certain value, 25 pounds per square inch in a preferred embodiment, it is time to regenerate filter cake 82.

Figure 5:
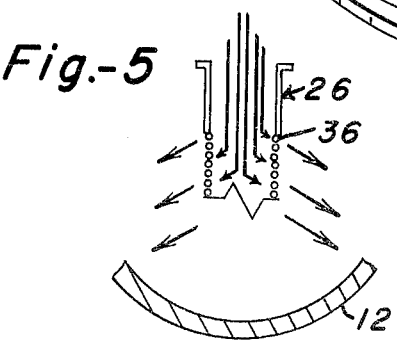
FIG. 5 is a schematic view illustrating the flow of liquid through a filter tube when the normal direction of flow is reversed.

To do so pump 40 is stopped, valve 46 is positioned in its second state, valve 52 is placed in its second state, and surge valve 58 is opened, or placed in its second state. Pump 40 is started and valves 48 and 50 are caused to change states substantially in unison from their second states to their first states, thence back to their second and so forth for several cycles. When valves 48 and 50 are in their second states, liquid from pump 40 flows through filtrate pipe 51 into filtrate chamber 20, then into the hollow interiors of filter tubes 26 and through the screens 36 of such tubes into filter chamber 18. FIG. 5 schematically illustrates the flow of liquid through the screen 36 of a filter tube 26 during such a period of reverse flow.

Figure 6:
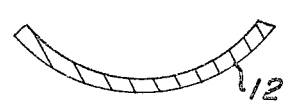
FIG. 6 is a schematic view illustrating the formation of a filter cake.

When valves 48 and 50 are in their first states, fluid from pump 40 flows into filter chamber 18 through filter inlet pipe 40, the normal direction of flow of liquid. Liquid in chamber 18 can flow out of chamber 18 through surge line 56 and through the filter tubes into filtrate chamber 20 and thence into precoat tank 44. The normal direction of flow of liquid through a filter tube is schematically illustrated in FIG. 6.

During the regeneration cycle the direction of flow of liquid through the filter tubes is changed rapidly which causes the liquid to oscillate or surge through the filter tubes to liquidize the filter cake 82 and the solids removed from the filtrate and to mix them with the liquids in the filter chamber so that the solids removed from the filtrate are substantially uniformly distributed, or mixed, with the filter material. The net amount of liquid flow during the regeneration cycle is small because of the oscillating nature of the flow and because the entire regeneration cycle requires only a short time to accomplish its purpose, on the order of one minute. The period of oscillation in a preferred embodiment is in the range of from 2 to 20 seconds, the preferred period being from 4 to 10 seconds. The number of cycles is in the range from 2 to 5, with the preferred number being 3. After the filter cake and removed solids are liquidized and substantially uniformly mixed, valves 48 and 50 are placed in their first states and the filter system is in its precoat cycle so that the filter material with the solids, or impurities, are deposited on the filter tubes and the filter cake 82 is reformed with the impurities substantially uniformly distributed throughout the cake as seen in FIG. 7. When the liquid flowing through the sight glass 60 is clear, filter system 10 is ready to go back on stream.

As the solids removed from the filtrate during production again build up on the outer surfaces of filter cake 82, the pressure in filter chamber 18 increases. When it reaches the designated limit, in a preferred embodiment, 25 pounds per square inch, it is again time to regenerate the filter cake as described above. Once the filter cake is liquidized and substantially uniformly mixed with the solids removed from the filtrate, the cake can be reformed as set forth above and the filter system put back on stream, or in production.

The filter cake can be regenerated many times in this way, but finally it will be so full of impurities, dirt or solids, removed from the filtrate that further efficient filtration is impossible. Then it is time to remove the impurities and filter material from the filter tubes 26 by liquidizing them and mixing them with the liquid in filter chamber 18 as described above. Pump 40 is stopped, valve 48 is put in its second state, shut off valve 62 is closed and valve 50 is placed in its first state which isolates filter chamber 18 and filtrate chamber 20 from the rest of the filter system 10. Sludge valve 74 is opened and air valve 70 is opened to force the liquid, dirt and filter material from filter chamber 18. After all the sludge and liquid from chamber 18 has been removed, the sludge valve 74 and air valve 70 are closed. The operation of the filter system is ready for the full cycle from filling the filter to precoating the tubes to production to regeneration, etc.

All the valves used in the filter system can be pneumatically or electrically powered or controlled instead of being manually controlled. When so controlled all the cycles, filling, precoating, operating, regenerating, and backwashing can be controlled and programmed by conventional control systems. Since such control systems form no part of this invention, they are not illustrated or further described.

From the foregoing it is clear that this invention provides methods and apparatus for regenerating the filter cake of a liquid filter system by inducing oscillations in the liquid in the filter chamber which liquidizes the filter material of the filter cake and the solid material removed by the filter cake, substantially uniformly mixes them, and reforms the filter cake with the solid material substantially uniformly distributed through the filter cake.

It should be evident that various modifications can be made to the described embodiments without departing from the scope of the present invention.

I claim:

1. A method for use in a liquid type filter vessel having at least one filter tube for regenerating the filter cake medium on the filter tube within the vessel, said filter cake formed by introducing a suspension of a liquid and small particles of filter material into said vessel so that when the liquid passes through the filter tube in a forward flow direction, the filter material will be deposited thereon to provide the filter medium for a continuous liquid filtering process, the regenerating method comprising the steps of
    (a) reversing the flow of a sufficient quantity of liquid through the filter tube for a sufficient time to dislodge the filter cake and retained solids from the filter tube;
    (b) causing the liquid within the vessel to move in a cyclic forward and reverse flow direction within the vessel to break up the filter cake formed by the particles of filter material and mix the particles and the retained solids to form a homogeneous liquidized suspension within the vessel; and
    (c) redepositing the mixture of the filter material and retained solids on the surface of the filter tube in order that the regenerated filter cake will be homogeneous throughout its thickness and will have a clean filter surface to improve the efficiency of the liquid filtering process.

2. A method for regenerating the filter cake in a liquid-type filter vessel, said filter cake which is the filter medium for the separation of solids from the liquid during the filtering process being formed by depositing a layer of filter material on the surface of a filter element within the vessel by passing a liquid suspension of said material in a forward flow direction through said vessel so that the liquid passes through the filter element leaving the filter cake formed on the surface of the said filter element, the regenerating method comprising the steps of
    (a) reversing the flow of liquid through the filter element and vessel with a sufficient flow quantity and for a sufficient time to dislodge the filter cake and retained solids from the filter element,
    (b) cycling the flow of liquid within said vessel in a forward and reverse flow direction a sufficient number cycles and time period to break up and mix the filter material and retained solids forming a homogeneous liquidized suspension within the vessel; and
    (c) flowing the liquid suspension in a forward flow direction so that the liquid again passes through the filter element leaving the filter material and retained solids as a homogeneous filter cake on said filter element whereby the regenerated filter surface of the cake is substantially free of solids to improve the efficiency of the filtering process.

3. The method of claim 2 in which the filter material is diatomaceous earth.

4. The method of claim 2 in which the liquid is water.

5. The method of claim 2 in which the number of cycles for complete flow reversal of the liquid within the vessel during the cycling step is at least three.

6. The method of claim 2 in which the time range during the cycling step for complete flow reversal mixing is within the range of four to ten seconds.

7. The method of claim 2 which further includes the step of removing a quantity of liquid from the filter vessel equal to the quantity of liquid used in the first flow reversal so that the dislodged filter cake will move substantially away from the filter element into the interior of the filter vessel for the cycling step.

8. The method of claim 2 in which the filter element is one or more filter tubes.

9. A method for regenerating the filter cake in a liquid-type filter system, said filter cake being formed by depositing a layer of filter material on the surface of a filter element within said system as the liquid passes in a forward flow direction through the filter element, the filter cake being used to continuously filter solids from the liquid during a filtering process, the regeneration method comprising the steps of
    (a) reversing of the flow of liquid through the filter element for a sufficient time and with a sufficient quantity to completely dislodge the filter cake and retained solids from the filter element;
    (b) cycling the flow of liquid within the filter system from the forward direction to the reverse direction for a sufficient number of cycles and time period to thoroughly break up and mix the filter material and retained solids into a homogeneous suspension in said liquid;
    (c) redepositing the suspension of filter material and retained solids in a homogeneous filter cake which will have a clean outer surface to improve the efficiency of the filtering process; and
    (d) flowing liquid in the forward filtering direction until such time that the efficiency of the filtering system drops below a predetermined level caused by subsequent retained solids at least partially blocking the outer surface of the filter cake; and repeating steps (a), (b), and (c) periodically as needed to continue the useful life of the original filter material in the filter system for an extended period of time.

10. A method for regenerating the filter cake in a filter system as described in claim 9 which further includes the step of disposing of the filter material and retained solids from said filter system when the quantity of solids retained in the filter material reaches a predetermined proportion wherein the filter process is no longer economically efficient.

11. A filter system for liquids comprising a filter regeneration system, said filter regeneration system comprising:
    (a) first and second path means;
    (b) said first path means comprising in sequence:
        pump means, first conduit means, first valve means, second conduit means, first filter housing nozzle means, filter element means, second filter housing nozzle means, third conduit means, second valve means, and fourth conduit means;
    (c) said second path means comprising in sequence:
        said pump means, said first valve means, fifth conduit means, said second valve means, said third conduit means, said second filter housing nozzle means, said filter element means, third filter housing nozzle means, and sixth conduit means; and (d) said regeneration system further comprising means to alternate flow between said first and second path means in a frequency and duration sufficient to liquify and homogeneously mix a filter cake which was on the surface of said filter element means; and (e) said filter system further comprising means to redeposit said liquified filter cake upon the surface of said filter element means as a single homogeneous layer.

* * * * *

UNITED STATES PATENT AND TRADEMARK OFFICE
CERTIFICATE OF CORRECTION

PATENT NO. : 4,153,552
DATED : May 8, 1979
INVENTOR(S) : Richard M. Muther

It is certified that error appears in the above–identified patent and that said Letters Patent are hereby corrected as shown below:

Column 5, line 28, after "Filtrate" insert --in--.

Column 7, line 15, after "cake", insert --being--.

Signed and Sealed this

Twentieth Day of November 1979

[SEAL]

Attest:

RUTH C. MASON
Attesting Officer

LUTRELLE F. PARKER
Acting Commissioner of Patents and Trademarks